No. 732,173. Patented June 30, 1903.

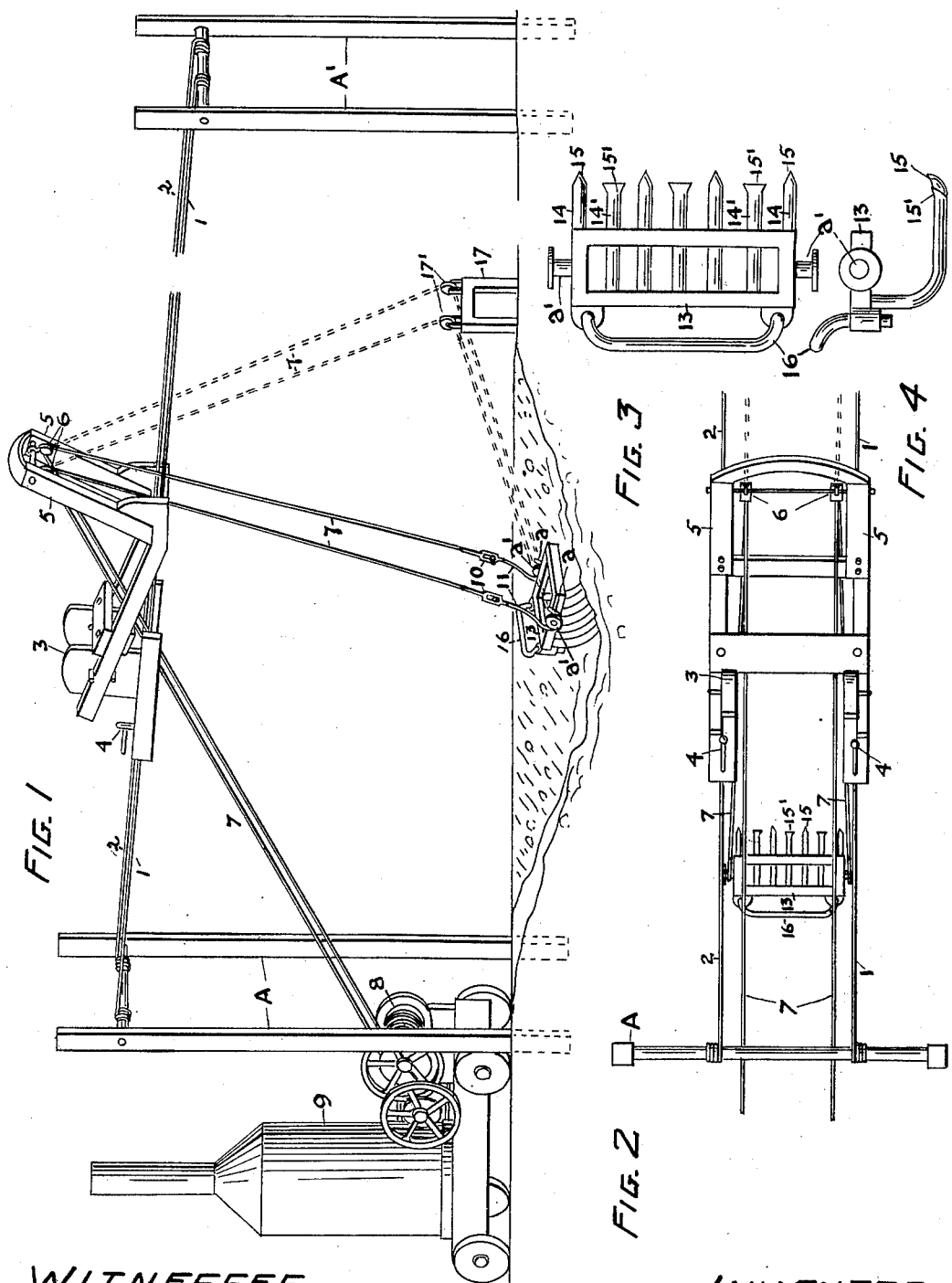

UNITED STATES PATENT OFFICE.

WALTER COLE, OF OLYMPIA, WASHINGTON.

EARTH-BREAKING APPARATUS.

SPECIFICATION forming part of Letters Patent No. 732,173, dated June 30, 1903.

Application filed November 25, 1902. Serial No. 132,728. (No model.)

*To all whom it may concern:*

Be it known that I, WALTER COLE, a citizen of the United States, residing at Olympia, county of Thurston, State of Washington, have invented certain new and useful Improvements in Earth-Breaking Apparatus; and I do hereby declare the following to be a full, clear, and exact description of the same.

The present invention is more particularly adapted for use in connection with the digging or excavating of narrow ditches for the construction of sewer-work; the object of the invention being to break up, loosen, or release the earth, more especially hard pan which is too hard to be cut by the excavating means, thereby facilitating the work of excavating or removing the earth.

It will be understood that the hereinafter-described apparatus is employed in advance of the excavating means—that is, it is utilized to break, loosen, release, or cut such of the soil to be removed as is too hard to be successfully removed by the excavating means without being first aided.

To comprehend the invention reference should be had to the accompanying sheet of drawings, wherein—

Figure 1 is a side view in elevation of the apparatus in position for work within the trench. Fig. 2 is a broken plan view of the mechanism disclosed by Fig. 1 of the drawings. Fig. 3 is a plan view of the drag used to loosen the dirt, and Fig. 4 is a side view of the same.

At each end of a section of the trench or ditch to be cut or excavated is located a support A A', which supports are connected by means of a suspended trackway consisting of cables 1 2. These supports are placed a distance of about one hundred (100) feet apart, the work of excavation being toward the rear supporting-frame A'. To the cables 1 2 is movably secured or attached the hoist-head 3, which is held in place upon the cables by means of any suitable cable-clamp means. In the drawings a drum-rope clamp is indicated by the reference-numeral 4. Such form of clamps being well known detail illustration thereof is not deemed necessary. From the hoist-head upwardly projects the hoist-block frame or arm 5, within which is secured and works the hoist-pulleys 6. Through these pulleys work the haulage-cables 7. One end of each cable is preferably attached to drum 8 of a hoisting-engine 9. To the free end of each cable is attached a hook-block 10, to which is swiveled the drag-hook 11. The drag-hooks have their ends $a$ turned so as to engage with bosses or studs $a'$, laterally projecting from the drag.

The drag or cutting implement 13 is provided with a series of cutting-teeth 14 and 14'. The former terminate in pick-points 15, while the latter are formed with chisel-points 15'. However, the cutting-point of each tooth is curved slightly upward, Fig. 4 of the drawings. The drag is held in position during the working thereof by a workman bearing upon the handle 16 thereof.

When it is required during the progress of the work to break up the surface of the soil for free working of the scuppet, scoop, or excavating means or to break up such "hardpan" as may be encountered during the progress of the work, the turned ends $a$ of the drag-hook are fitted onto the laterally-projecting studs or bosses $a'$ of the drag or cutting implement 13. The engine 9 is then operated to wind the haulage-cables 7 upon winding-drum 8. As thus wound the said cables draw the drag or cutting implement 13 over the surface of the soil to be broken up. The drag is so held by the workman that the cutting-points of the teeth are presented to and caused to cut into the earth as drawn thereover. As the drag approaches the hoist-head 3, located a given distance from the support A, the haulage-cables gradually raise the said drag. It is then necessary to slacken the haulage-cables and to draw the drag to its original starting-point in case it is desired to make a second loosening of the soil over which the drag has been drawn. In case it is desired to extend the breaking up of the soil it is only required that the hoist-head be released from the cables 1 2 and reset a greater distance from end support A. To release the drag or cutting implement from the haulage-cables, the ends of the drag-hooks are disengaged from the laterally-projecting studs or bosses $a'$ of the drag.

In case the haulage-cables tend to draw the drag at too great an inclination an anchor 17 may be employed. This anchor when utilized is secured within the earth a short distance beyond the hoist-head 3. This anchor is provided with pulleys 17′, through which the haulage-cables are run prior to being attached to the drag. The running of the said cables through such anchor is illustrated in dotted lines in Fig. 1 of the drawings. By the use of this anchor a straight pull is exerted upon the drag, causing the same to move horizontally to a point adjacent to the anchor.

Having thus described the invention, what is claimed as new, and desired to be protected by Letters Patent, is—

1. An earth-breaking apparatus comprising a drag provided with a series of cutting-teeth, certain of the cutting-teeth having chisel-points and the remaining teeth having pick-points, a haulage-cable for the drag, a swivel-hook connecting the drag to the said cable, and means whereby the cable is operated to draw the drag over the earth to be broken.

2. The combination with an implement for breaking ground, the same consisting of a frame provided with a series of teeth the cutting-points of which are upwardly curved, of a haulage-cable for the drag, means for operating the cable to draw the drag over the earth to be broken, and means whereby the drag is detachably connected to the haulage-cable.

3. An earth-breaking apparatus comprising a suspended trackway, a hoist-head adjustably secured thereto, a haulage-cable working therethrough, an anchor through which the cable works, means for winding said haulage-cable, and an earth-breaking implement attached to the free end of such cable.

In witness whereof I have hereunto set my hand.

WALTER COLE.

Witnesses:
  MARION E. GILES,
  FRANK H. HALL.